United States Patent
Pratt (10) Patent No.: US 9,135,046 B1
(45) Date of Patent: Sep. 15, 2015

(54) PREVENTING HOST OPERATING SYSTEM FROM INSPECTING OR MODIFYING DATA RECEIVED BY HARDWARE CONTROLLER BY MOVING HOST OPERATING SYSTEM INTO A VIRTUAL MACHINE AFTER BOOT UP

(75) Inventor: Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 434 days.

(21) Appl. No.: 13/526,769

(22) Filed: Jun. 19, 2012

(51) Int. Cl.
G06F 9/455 (2006.01)
G06F 9/48 (2006.01)
G06F 9/50 (2006.01)
G06F 9/44 (2006.01)

(52) U.S. Cl.
CPC .......... *G06F 9/45558* (2013.01); *G06F 9/4401* (2013.01); *G06F 9/48* (2013.01); *G06F 9/50* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,496,847 B1 | 12/2002 | Bugnion et al. | |
| 6,944,699 B1 | 9/2005 | Bugnion et al. | |
| 7,418,584 B1 | 8/2008 | Klaiber et al. | |
| 7,636,800 B2 | 12/2009 | Ben-Yehuda et al. | |
| 7,665,088 B1 | 2/2010 | Bugnion et al. | |
| 7,739,514 B2 | 6/2010 | Bangui | |
| 7,865,893 B1 * | 1/2011 | Omelyanchuk et al. | 718/1 |
| 7,904,540 B2 | 3/2011 | Hadad et al. | |
| 8,151,032 B2 | 4/2012 | Oshins | |
| 8,261,265 B2 | 9/2012 | Chen et al. | |
| 8,370,838 B1 * | 2/2013 | Omelyanchuk et al. | 718/1 |
| 8,484,392 B2 | 7/2013 | Manula et al. | |
| 8,539,137 B1 | 9/2013 | Protassov et al. | |
| 8,549,210 B2 | 10/2013 | Hunter et al. | |
| 8,555,081 B2 | 10/2013 | Chen et al. | |
| 8,555,377 B2 | 10/2013 | Pate | |
| 9,021,476 B1 * | 4/2015 | Pratt | 718/1 |
| 2005/0021936 A1 * | 1/2005 | Bailey et al. | 713/100 |
| 2005/0132365 A1 * | 6/2005 | Madukkarumukumana et al. | 718/1 |
| 2008/0140866 A1 * | 6/2008 | Corry et al. | 710/8 |
| 2008/0201550 A1 * | 8/2008 | Bailey et al. | 711/173 |
| 2009/0113216 A1 | 4/2009 | Chen et al. | |
| 2009/0113425 A1 | 4/2009 | Ports et al. | |
| 2009/0119684 A1 * | 5/2009 | Mahalingam et al. | 719/324 |
| 2010/0077063 A1 * | 3/2010 | Amit et al. | 709/221 |
| 2010/0332212 A1 * | 12/2010 | Finkelman | 703/23 |
| 2012/0102252 A1 * | 4/2012 | Tsirkin | 710/302 |
| 2013/0055254 A1 * | 2/2013 | Avasthi et al. | 718/1 |
| 2013/0155083 A1 * | 6/2013 | McKenzie et al. | 345/522 |

* cited by examiner

*Primary Examiner* — Emerson Puente
*Assistant Examiner* — Benjamin Wu
(74) *Attorney, Agent, or Firm* — Brokaw Patent Law P.C.; Christopher J. Brokaw (57) ABSTRACT

Approaches for ensuring the privacy of a controller of a device from a host operating system. A host operating system is prevented from inspecting or modifying data received by a controller of a hardware device. Control of the controller is withdrawn from the host operating system and granted to a hypervisor. A replacement controller for the hardware device is provided to the host operating system. Upon the hypervisor receiving data via the controller, the hypervisor forwards the data to a relevant virtual machine responsible for processing the data. Although the host operating system may operate as if it possessed control of the controller of the hardware device, any malicious code inadvertently residing within the host operating system will be unable to inspect or modify any data received by or sent from the actual controller of the hardware device.

24 Claims, 4 Drawing Sheets

PREVENTING HOST OPERATING SYSTEM FROM INSPECTING OR MODIFYING DATA RECEIVED BY HARDWARE CONTROLLER BY MOVING HOST OPERATING SYSTEM INTO A VIRTUAL MACHINE AFTER BOOT UP

CLAIM OF PRIORITY

This application is related to U.S. patent application Ser. No. 13/526,755, entitled Ensuring the Privacy and Integrity of a Hypervisor, filed Jun. 19, 2012, invented by Ian Pratt, the disclosure of which is incorporated by reference for all purposes as if fully set forth herein.

FIELD OF THE INVENTION

Embodiments of the invention relate to securing a controller of a device from a host operating system.

BACKGROUND

A hypervisor is a software component that enables multiple operating systems (termed "guest operating systems") to run on a single device. Each guest operating system is executed within a separate virtual machine.

There are two widely recognized types of hypervisors, termed Type 1 and Type 2. A Type 1 hypervisor (also known as a native, bare metal hypervisor) executes directly upon the hardware of the device. With a Type 1 hypervisor, a guest operating system runs on a level above the hypervisor. Since a Type 1 hypervisor executes directly upon the hardware, a Type 1 hypervisor is the most privileged software component within the system.

A Type 2 hypervisor (also known as a hosted hypervisor) executes within a conventional operating system (termed the "host operating system" in this context). A Type 2 hypervisor instantiates guest operating systems using the memory and resources allocated to the hypervisor by the host operating system. As with a Type 1 hypervisor, guest operating systems run at a lower privilege level than the hypervisor. However, unlike a Type 1 hypervisor, a Type 2 hypervisor is not the most privileged component within the system. Instead, in a system employing a Type 2 hypervisor, the host operating system is at the same privilege level as the Type 2 hypervisor, and hence, the host operating system can interfere with the Type 2 hypervisor.

If malicious code infects a host operating system that employs a Type 2 hypervisor, then the malicious could potentially compromise the Type 2 hypervisor, since processes executing within the host operating system kernel are running at the same privilege level as the Type 2 hypervisor. It is desirable to prevent a Type 2 hypervisor (and by extension guest virtual machines) from being compromised from any malicious code executing within the host operating system.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for securing a controller of a device from a host operating system are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention protect the privacy and integrity of a hypervisor executing within a host operating system. To do so, embodiments enable the hypervisor to be the most privileged software component operating within a system. For example, using an embodiment, the hypervisor is more privileged than the host operating system. In this way, processes executing outside of the hypervisor (such as those processes executing within the host operating system) cannot affect the privacy or integrity of the hypervisor.

In an embodiment, to secure the hypervisor, the host operating system is prevented from accessing a portion of resources belonging to or allocated by a hypervisor to prevent the host operating system from violating the privacy and integrity of those resources. In an embodiment, the host operating system may be prevented from accessing resources belonging to or allocated by the hypervisor by transferring execution of the host operating system into a virtual machine container that does not have sufficient privilege to access any portion of the memory pages in which the hypervisor is executing.

A wide variety of resources of the hypervisor may be protected in this manner. For example, non-limiting, illustrative examples of the types of resources of the hypervisor which may be protected in this manner include memory, scheduling access to a central processing unit (CPU), and access to one or more input/output devices.

Preventing the Host from Accessing Hypervisor Resources

Figure 1:
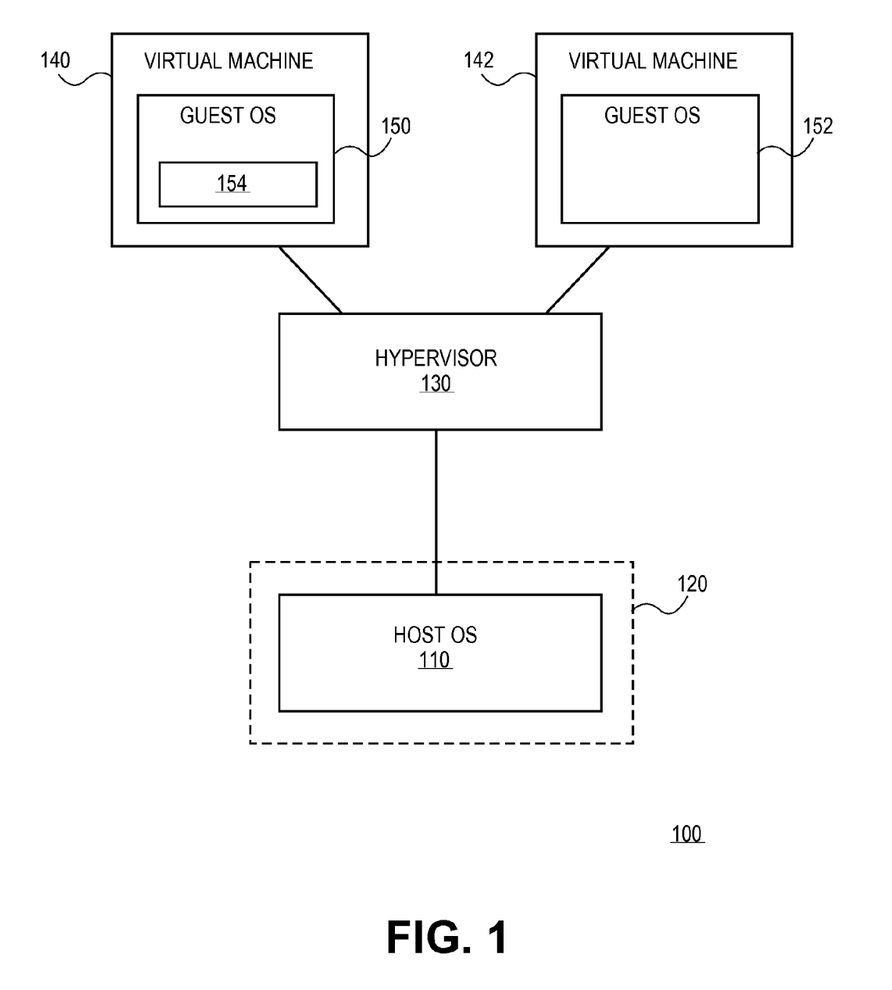
FIG. 1 is a block diagram illustrating an exemplary system according to an embodiment of the invention.

FIG. 1 is a block diagram illustrating an exemplary system 100 according to an embodiment of the invention. System 100 includes a set of software components, namely host operating system 110 (hereafter "host OS 110"), hypervisor 130, and virtual machines 140 and 142. The software components of system 100 may reside and operate on a wide variety of physical devices. For example, non-limiting, illustrative examples of the types of physical devices upon which system 100 may reside and operate include a personal computer (PC), a tablet PC, a laptop computer, a cell phone, a personal digital assistance (PDA), and the like.

Host OS 110 is intended to broadly represent any type of operating system which is capable of managing a set of resources. Hypervisor 130 is intended to broadly represent any type of hypervisor that executes within host OS 110. Hypervisors that execute within a host operating system may be referred to as Type 2 hypervisors; although, as shall be evident from the present teachings, hypervisor 130 of an embodiment operates differently than Type 2 hypervisors known in the art.

Hypervisor 130 is capable of creating and managing a plurality of different operating systems (conventionally termed "guest operating systems") using the memory and other resources available to hypervisor 130. Guest operating systems within system 100 are intended to execute within a virtual machine. FIG. 1 depicts guest operating systems (hereafter simply guest OS) 150 and 152 which execute within virtual machines 140 and 142 respectively.

While FIG. 1 only depicts two virtual machines, it will be evident to those in the art that hypervisor 130 may create any number of virtual machines. Furthermore, hypervisor 130 may, at various times, de-allocate a particular virtual machine when it is no longer needed. Therefore, the number of virtual machines, and by extension the number of guest operating systems, within system 100 may vary over time and from implementation to implementation.

Resources, such as memory, access to the CPU, and access to an I/O device, may be assigned or allocated to hypervisor 130. Hypervisor 130, in turn, may allocate a certain portion of these resources to a virtual machine instantiated by hypervisor 130.

Each guest operating system may comprise one or more components that issue requests to perform operations (such as an I/O operation) to host OS 110 via hypervisor 130. FIG. 1 depicts an example of such components in guest OS 150 as device driver component 154. Device driver component 154 may require access to resources, such as access to a persistent storage, a network, or the CPU. Host OS 110 will process requests originating from device driver component 154 for access to resources. Device driver component 154 may, in certain embodiments, correspond to a paravirtual device driver that is designed specifically for a hypervisor environment or to a hardware device driver designed to communicate with a hardware component, which in a hypervisor environment communicates with an emulation of that hardware device.

In an embodiment, to prevent host OS 110 from accessing resources belonging to or allocated by hypervisor 130, execution of host OS 110 is transferred into virtual machine container 120. Virtual machine container 120, as broadly used herein, refers to any container, abstraction, or mechanism which may be used to enforce and manage access to a bounded area of memory. For example, virtual machine container 120 may be implemented as a VMCS container provided by certain Intel® hardware by an embodiment. Virtual machine container 120 is designed or configured to have insufficient privilege to access any portion of the set of memory pages in which hypervisor 130, or any virtual machine instantiated thereby, reside. Therefore, processes executing within virtual machine container 120 cannot access resources assigned to or allocated by hypervisor 130, but for certain exceptions discussed below.

Embodiments may employ different mechanisms to ensure that virtual machine container 120 lacks sufficient privilege to access resources allocated to or by hypervisor 130. One way for doing so is by removing reference to the set of memory pages in which hypervisor 130 resides from the Extended Page Tables (EPT) of host OS 110. Extended Page Tables are tables used by a Memory Management Unit (MMU) to map guest-physical addresses to host-physical addresses. Thus, in an embodiment, the Extended Page Tables of virtual machine container 120 allows host OS 110 to access the memory and other resources host OS 110 is supposed to possess, but not the memory and other resources belonging to or allocated by hypervisor 130. Hardware components, such as a MMU, may establish and enforce constraints on what portions of memory host OS 110 is allowed to access based on data within the Extended Page Tables.

Embodiments may take different approaches for establishing host OS 110 within virtual machine container 120. For example, in one embodiment, initially, host OS 110 boots. Thereafter, after booting host OS 110, host OS 110 is transferred into a virtual machine container 120. In a different approach, prior to booting host OS 110, a portion of machine memory that host OS 110 cannot access is reserved. This reserved area of memory may be a VMCS container in an embodiment. Thereafter, hypervisor 130 is instantiated within the reserved portion of memory which host OS 110 cannot access.

In an embodiment, once host OS 110 is prevented from accessing any resources belonging to or allocated by hypervisor 130, devices under the control of host OS 110 are prevented from performing unauthorized direct memory accesses (DMA) to resources belonging to or allocated by hypervisor 130 by means of configuring the input/output memory management unit (IOMMU). However, that is not to say that host OS 110, or devices under control of host OS 110, can never access the resources belonging to or allocated by hypervisor 130. Indeed, in the natural course of operation, hypervisor 130 will rely upon host OS 110 to perform certain activity, such as I/O operations, on behalf of hypervisor 130 and virtual machines 140 and 142.

To balance the need to have host OS 110 perform I/O operations for hypervisor 130 while minimizing the scope of access afforded to host OS 110, in embodiments of the invention, hypervisor 130 may provide host 110 temporary access to those memory pages involved in the performance of an operation (such as an I/O operation). Thereafter, hypervisor 130 may revoke access to those memory pages from host OS 110, presumably once the I/O operation has been performed. In this way, host OS 110 only has access to those memory pages necessary to perform the operations it has been requested to perform by hypervisor 130 or virtual machines 140 and 142.

To illustrate a concrete example, hypervisor 130 or virtual machines 140 and 142 may provide host OS 110 temporary access to a set of memory pages by granting a token to host OS 110. Thus, when host OS 110 performs an I/O operation it can present the token to the hypervisor 130 to facilitate the reading from or writing to the location of memory identified by the token as required by the requested operation.

Rather than providing a memory address to hypervisor 130 to identify a set of memory pages at which a requested operation is to be performed, host OS 110 need only provide a token. When host OS 110 wishes to read or write to a set of memory pages allocated to hypervisor 130, host OS 110 notifies hypervisor 130 that host OS 110 desires that a particular operation be performed against a set of memory pages and provides a token for those memory pages to hypervisor 130. If the token is valid, then hypervisor 130 will permit the read or write operation to the set of memory pages identified by the token. Hypervisor 130 will subsequently revoke the temporary permission to write to that location in memory from host OS 110 by causing the token to become invalid. If the token is invalid, then hypervisor 130 will not permit the operation to be performed by host OS 110.

If a guest operating system uses a paravirtual device driver, then the paravirtual device driver will make an explicit request to hypervisor 130 to allow host OS 110 access to a particular area of memory for purposes of performing IO operations. If the device driver component 154 is for a regular hardware device, then hypervisor 130 will have to parse the instructions given to device driver component 154 for the emulated hardware to identify the areas of memory in which the guest operating system is implicitly desiring IO operations to be performed against.

Ensuring the Privacy and Integrity of Hypervisor Memory

When hypervisor 130 or a guest OS desires an I/O operation to be performed, hypervisor 130 will ask host OS 110 to perform the I/O operation. As explained above, in doing so, hypervisor 130 will provide a token to host OS 110 so that host OS will have temporary access to a set of memory pages in which the I/O operation is to be performed. In an embodiment, either hypervisor 130 or a guest operating system may encrypt data before the data is provided to host OS 110 so that host OS 110 may perform an I/O operation using an encrypted version of the data rather than the original version. In this way, host OS 110 only has access to an encrypted version of the data and any programs executing within host OS 110 cannot inspect the encrypted version of the data. As a result, the privacy of hypervisor 130 and guest OSes is ensured since other components cannot inspect data written or read by hypervisor.

To illustrate using an embodiment where hypervisor 130 is responsible for encrypting the data, if hypervisor 130 instructs host OS 110 to write a page of memory to disk, then hypervisor 130 may encrypt the page of memory to create an encrypted version prior to requesting host OS 110 to write the page of memory to a persistent storage, such as a hard-disk drive (HDD) or solid state device (SSD). Note that a guest operating system executing within a virtual machine, such as guest OS 150 of virtual machine 140, may request hypervisor 130 to perform an I/O operation, and so hypervisor 130, in instructing host OS 110 to perform an I/O operation, may be acting on behalf of a virtual machine in system 100.

When hypervisor 130 requests host OS 110 to read into memory the page of memory from persistent storage, host OS 110 will read the encrypted page of memory into a location in memory using the token provided to host OS 110 by hypervisor 130.

In an embodiment, after hypervisor 130 revokes from host OS 110 access to the encrypted version of the page in memory, hypervisor 130 decrypts the encrypted version of the page of memory. If a virtual machine requested the performance of the read operation, then hypervisor 130 would then provide that virtual machine access to the page of memory.

In an alternate embodiment, after host OS 110 reads the encrypted page of memory into a set of memory pages, hypervisor 130 copies the encrypted version into a different location in memory to which the host OS 110 does not have permission to access. Hypervisor 130 may copy the encrypted version into the different location in memory either of its own initiative or at the direction of a guest operating system, or as a result of the host presenting a suitable token. Thereafter, hypervisor 130 decrypts the encrypted version of the page of memory at its present location. If a virtual machine requested the performance of the read operation, then hypervisor 130 would then provide that virtual machine access to the page of memory.

In an embodiment, hypervisor 130 may use a cryptographic checksum to ensure data outside the control of hypervisor 130 has not been tampered with. Using a cryptographic checksum, the integrity of resources belonging to or allocated by hypervisor 130 may be ensured. A cryptographic checksum is data that is computed using a set of input data and an algorithm to ensure that the input data has not been modified since the cryptographic checksum was calculated. Embodiments of the invention may employ a wide variety of approaches for obtaining a cryptographic checksum. Various entities may generate the cryptographic checksum, e.g., in some embodiments, hypervisor 130 may generate the cryptographic checksum while in other embodiments a guest operating system or other component may generate the cryptographic checksum and provide it to hypervisor 130. Embodiments of the invention may obtain a cryptographic checksum upon encrypted or unencrypted data.

To illustrate how a cryptographic checksum is used by an embodiment, consider an example involving hypervisor 130 instructing host OS 110 to write a page of memory to persistent storage. In an embodiment, hypervisor 130 generates a cryptographic checksum on a page of memory prior to providing host OS 130 access to the encrypted version of the page of memory. The cryptographic checksum will be used by hypervisor 130 to verify the integrity of the encrypted version of the page of memory. Embodiment of the invention may obtain the cryptographic checksum on the page of memory either before or after encrypting the page of memory. Host OS 110 may then write the cryptographic checksum to a persistent storage contemporaneous with writing the encrypted version of the page of memory to the persistent storage.

Advantageously, the hypervisor 130 may determine, using a cryptographic checksum, whether the integrity of the encrypted version of a page has been violated since leaving the custody of hypervisor 130. The cryptographic checksum may be retrieved by host OS 110 from the persistent storage on which the encrypted version of the data was stored. Host OS 110 may present the cryptographic checksum to hypervisor 130 along with the encrypted version of the data.

Saving and Restoring a Virtual Machine

Figure 2:
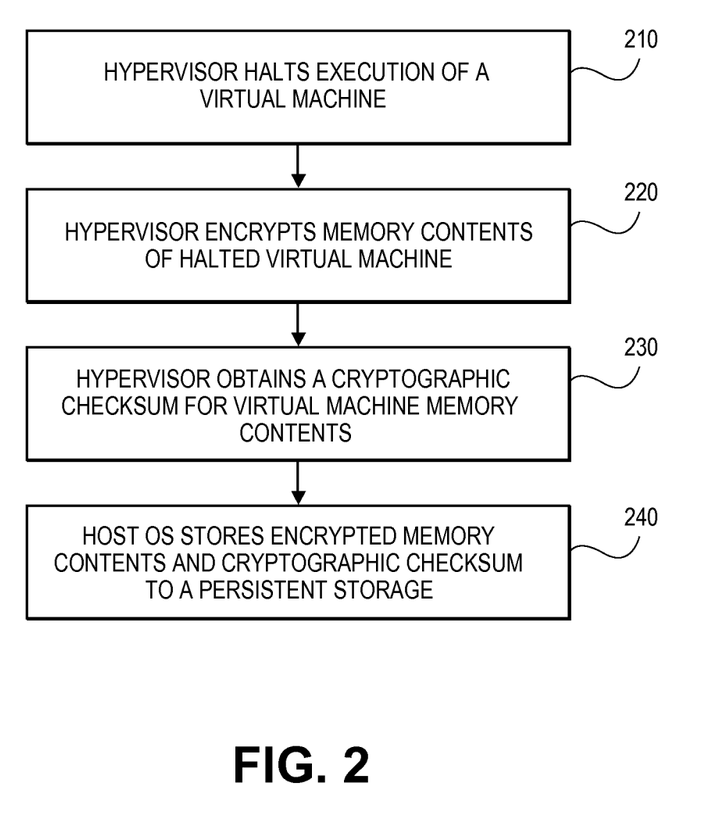
FIG. 2 is a flowchart illustrating the functional steps of saving a virtual machine according to an embodiment of the invention.

Embodiments of the invention enable hypervisor 130 to save and restore entire virtual machines in a manner that preserves the integrity and privacy of the virtual machine. FIG. 2 is a flowchart illustrating the functional steps of saving a virtual machine according to an embodiment of the invention. In step 210, hypervisor 130 halts execution of particular virtual machine. For example, hypervisor 130 may halt the execution of virtual machine 140 of FIG. 1.

In step 220, hypervisor 130 encrypts the contents of memory associated with virtual machine 140 to create encrypted memory contents.

In step 230, hypervisor 130 generates or obtains one or more cryptographic checksums for the encrypted contents. Note that step 230 may be performed upon either the unencrypted or encrypted memory contents; as a result, in certain embodiments step 230 may be performed before 220.

In step 240, host OS 110 stores the encrypted memory contents and any cryptographic checksums generated in step 130 on a persistent storage, such as a hard-disk drive (HDD) or a solid state device (SSD).

Once a virtual machine has been saved to a persistent storage, it may be restored to memory to facilitate the resumption of its operation. In an embodiment, to restore a virtual machine stored on a persistent storage, host OS 110 reads the encrypted contents for the virtual machine from the persistent storage into the memory of a newly instantiated virtual machine container. After removing access to the encrypted contents from host OS 110, hypervisor 130 may, in any order: (a) assess the integrity of the encrypted contents using the cryptographic checksum and (b) decrypt the encrypted contents for the particular virtual machine. Alternately, in another embodiment, to restore a virtual machine stored on a persistent storage, rather than expressly revoking access from host OS 110 to the location in memory to which the encrypted data is copied, after host OS 110 copies the encrypted data into memory, the encrypted data may simply be copied into another location in memory to which host OS 110 cannot access. Thereafter, the integrity and privacy of the encrypted data may be assessed, and absent any corruption or intrusion to the data, the requesting party may safely access the data.

Saving and restoring a virtual machine in this fashion may be used by certain embodiments in starting up each virtual machine. In other words, each new virtual machine may be a restore of a previously saved virtual machine. In this way, a newly instantiated virtual machine may have a desired set of characteristics. In another approach, the desired memory contents of a newly instantiated virtual machine may be comprised within hypervisor 130; when a new virtual machine is started, the memory contents for that virtual machine may be supplied by hypervisor 130.

Reducing Memory

Hypervisor 130 may determine that it is necessary to reduce its memory consumption. Alternately, host OS 110 may request hypervisor 130 to reduce the amount of memory used by hypervisor 130. Hypervisor 130 will evict memory pages used by itself or a virtual machine to reduce the amount of memory consumed by hypervisor 130. When hypervisor 130 decides to evict a set of memory pages from a particular virtual machine, hypervisor 130 encrypts the set of memory pages and obtains a cryptographic checksum for the encrypted memory pages. Hypervisor 130 then instructs host OS 130 to persistently store the encrypted memory pages and the cryptographic checksum to a persistent storage. Thereafter, hypervisor may safely evict the set of memory pages from memory and reduce, if desired, an amount of memory allocated to hypervisor 130, and thus return the page to the host.

When hypervisor 130 decides to read a set of evicted memory pages back into the memory of a particular virtual machine, hypervisor 130 instructs host OS 130 to read the memory pages (which will be encrypted) and a cryptographic checksum from a persistent storage. Hypervisor 130 verifies the integrity of the encrypted memory pages using the cryptographic checksum, and decrypts the encrypted memory pages. Hypervisor 130 may then provide access to the decrypted memory pages to the particular virtual machine.

Verifying Integrity of the Hypervisor

In an embodiment, the integrity of hypervisor 130 may be verified loading hypervisor 130 into memory. In an embodiment, after loading hypervisor 130 into memory, host OS 110 may relinquish access to the memory belonging to hypervisor 130. Thereafter, a cryptographic measurement of hypervisor 130 may be obtained using hardware support.

Securing a Controller of a Device from a Host OS

If malicious code were to be inadvertently introduced into host OS 110, then the malicious code may be able to inspect data received by controllers of a hardware device. One example of such malicious code is commonly referred to as a "keylogger." A keylogger is a software program which records the keystrokes of a user for nefarious purposes, such as discovering passwords and the like. A keylogger program typically runs in host OS 110 and snoops upon the keystrokes made by a user by inspecting data identifying keystrokes sent to the controller of the keyboard from the keyboard.

Figure 4:
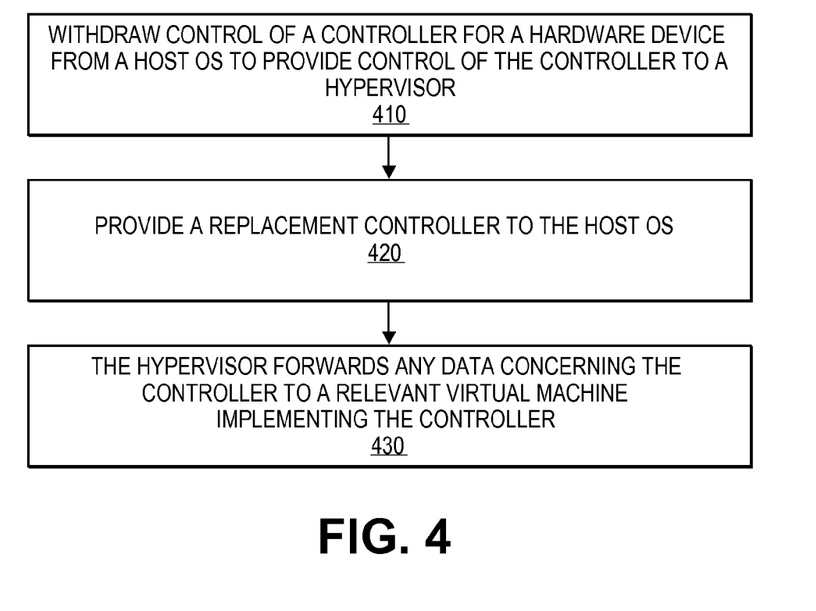
FIG. 4 is a flowchart illustrating the steps of preventing a host OS from inspecting or modifying data received by a controller of a hardware device according to an embodiment of the invention.

Advantageously, embodiments of the invention prevent any program or process executing within host OS 110 from inspecting or modifying any data received by a controller of a hardware device. FIG. 4 is a flowchart illustrating the steps of preventing host OS 110, including any program or process executing within host OS 110, from inspecting or modifying data received by a controller of a hardware device according to an embodiment of the invention. A controller of a hardware device, as used herein, refers to any software component responsible for processing data exchanged with a hardware device.

Figure 3:
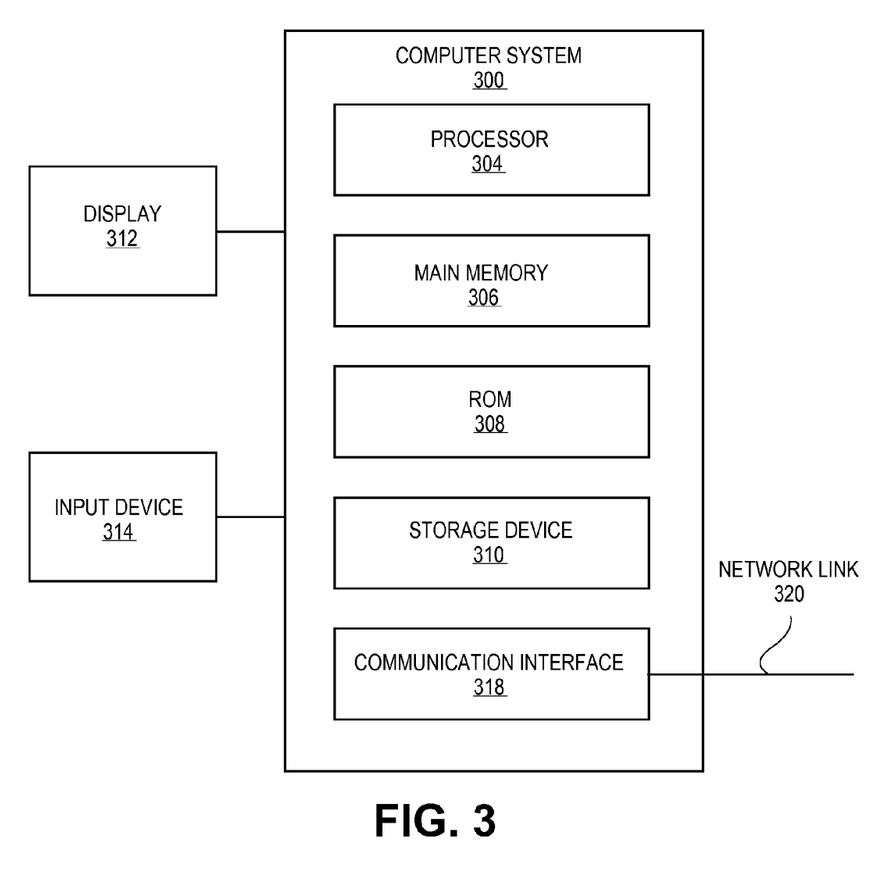
FIG. 3 is a block diagram that illustrates a computer system upon which an embodiment of the invention may be implemented.

A hardware device, in this context, refers to any type of physical component from which data may be received or to which data may be sent. A hardware device may be operationally connected to computer system 300 described below and may include any device or component capable of operating with a controller. As an example, in an embodiment, the hardware device may be a keyboard, and the data sent to the controller of the keyboard may identify one or more keystrokes performed on the keyboard. As another example, the hardware device may be a network interface card (NIC), and the data sent to the controller of the NIC may correspond to one or more packets that have been received or transmitted by the NIC.

As another example, the hardware device may be a physical display device, and the data sent to the controller of the physical display device may correspond to information shown on the physical display. As another example, the hardware device may be an I/O device, and the data sent to the controller of the I/O device may correspond to any data, received by the I/O device, that originates from a user, a hardware component, or a software entity. As one more example, the hardware device may be a storage device, such as a hard-disk drive or a solid state device.

In an embodiment, the steps of FIG. 4, such as step 410, may be performed contemporaneous with establishing host OS 110 within virtual machine container 120.

In step 410, control of the controller is withdrawn from host OS 110 and granted to hypervisor 130. In order to properly transition possession of the controller from host OS 110 to hypervisor 130, it is necessary to ensure that there are no outstanding I/O operations, such as a direct memory access (DMA) operation, in progress. One way to do so is to place host OS 110 in a virtual sleep state (which may be either S1, S2, or S3) to quiesce the hardware devices operationally connected to host OS 110. Note that the virtual sleep state does not cause the physical host to sleep; instead, virtual machine container 120 may be put into a sleep state to quiesce all devices connected to host OS 110.

Alternately, in another embodiment, a hot unplug event may be used as the mechanism to gracefully remove the controller from the control of host OS 110. The control of the controller will be transferred to hypervisor 130 or a virtual machine that is delegated responsibility for the controller by hypervisor 130. After taking over the device by assuming control of the controller, hypervisor 130 or its delegated virtual machine may reset the controller to return the controller to a known state.

Note that in some embodiments, hypervisor 130 may instantiate a virtual machine in which control of the controller is to be implemented. In such an embodiment, prior to performing step 410, hypervisor may instantiate a virtual machine in which the control function is to be implemented, and in performing step 410, hypervisor 130 may grant that responsible virtual machine control of the controller. Hypervisor 130 may instantiate a plurality of virtual machines; each of the plurality of virtual machines may implement a different controller for a different hardware device.

Figure 5:
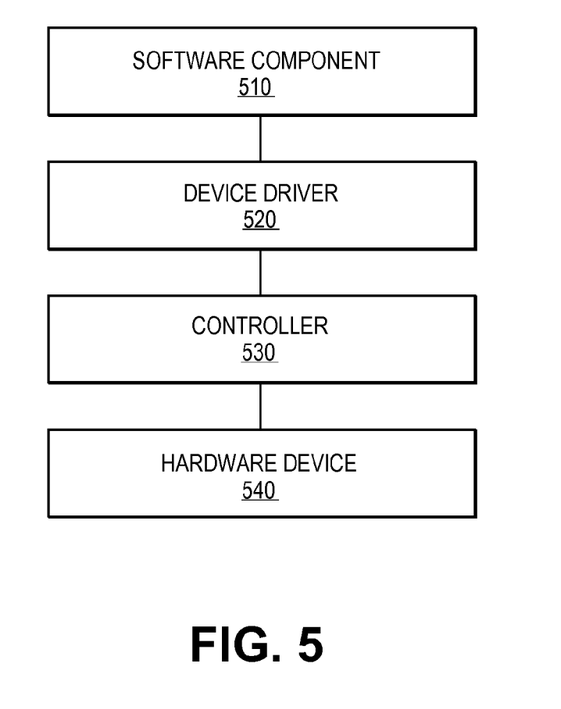
FIG. 5 is a block diagram of a controller in relation to a device driver and a hardware device according to an embodiment of the invention.

In step 420, a replacement controller for the hardware device is provided to host OS 110. To understand the role of the replacement controller, it will be helpful to understand the nature of the controller. FIG. 5 is a block diagram of a controller in relation to a device driver and a hardware device according to an embodiment of the invention. For every hardware device 540, there is a controller 530. Controller 530 shown in FIG. 5 is implemented in hardware and functions to control the operation of hardware device 540. In certain cases (not depicted in FIG. 5), controller 530 may be implemented as part of hardware device 540. In other cases (as shown in FIG. 5), controller 530 may connect to hardware device 540.

The replacement controller of step 420 is an emulated controller 430. The replacement controller that is provided to host OS 110 in step 420 is not intended to control and communicate with the real device (i.e., hardware device 540); instead, the role played by the emulated replacement controller is to convince host OS 110 that host OS 110 continues to have access to the hardware device, but under the mediation of hypervisor 130. Indeed, steps 410 and 420 may be performed in a cooperative action by some embodiments so that host OS 110 may not be able to detect that the controller was swapped for the replacement controller.

The replacement controller may be implemented differently from implementation to implementation. For example, the replacement controller may be an emulated controller for the same type of device as the hardware device, an emulated controller for a different type of device as the hardware device, or a paravirtual device driver.

In an embodiment, a hot plug event may be used as the mechanism for gracefully enabling control of the replacement controller to be provided to host OS 110.

In an embodiment, prior to removing control of the controller from host OS 110 in step 410, an operational state of the hardware device from the controller may be read. Information about the operational state may be transferred to the replacement controller so that the replacement controller can emulate the same state and device characteristics. For example, if the hardware device is a storage device, then information may be read from the controller and transferred to the replacement controller so that the replacement controller emulates the same type of storage device in the same state.

After the replacement controller for the hardware device is provided to host OS 110, then host OS 110 may be woken up from its virtual sleep state. Once host OS 110 awakens, host OS 110 will treat the replacement controller as a fully functioning controller, although in reality the replacement controller will not receive any input from the real hardware device. Thus, when a user presses a key on a keyboard, data identifying the pressed key will be sent to the controller and not the replacement controller in the possession of host OS 110.

In step 430, upon hypervisor 130 receiving the input data via the controller, hypervisor 430 may forward the input data to the virtual machine it deems to be the relevant recipient. In this way, any virtual machine implementing a control function will receive the data sent to the controller that is relevant to it; however, host OS 110, and any process or program running therein, will be unable to inspect or modify such data. This provides an assurance that that even if host OS 110 is compromised with malicious code, such malicious code could not inspect or modify any data sent to or from a device controller.

Hardware Mechanisms

In an embodiment, system 100 of FIG. 1 may be implemented on a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions, which when executed by one or more processors, cause:
    preventing a host operating system from inspecting or modifying data received by a controller of a hardware device by performing:
        immediately after booting the host operating system, contemporaneously moving the host operating system to a virtual machine container and withdrawing direct control of the controller from the host operating system by granting control of the controller to a hypervisor;
        after moving the host operating system to the virtual machine container, providing a replacement controller for the hardware device to the host operating system, wherein said replacement controller is not capable of communicating with said hardware device; and
    upon the hypervisor receiving the data via the controller, the hypervisor forwarding the data to a relevant virtual machine responsible for processing the data.

2. The one or more non-transitory computer-readable storage mediums of claim 1, wherein the replacement controller is an emulated controller for the same type of device as said hardware device, an emulated controller for a different type of device as said hardware device, or a paravirtual device driver.

3. The one or more non-transitory computer-readable storage mediums of claim 1, wherein withdrawing control of the controller from the host operating system comprises:
    the host operating system entering a virtual sleep state to quiesce said hardware device.

4. The one or more non-transitory computer-readable storage mediums of claim 1, wherein execution of the one or more sequences of instructions further causes:
    generating a hot unplug event to remove the controller from the control of the host operating system; and
    generating a hot plug event to provide control of the replacement controller to the host operating system.

5. The one or more non-transitory computer-readable storage mediums of claim 1, wherein execution of the one or more sequences of instructions further causes:
    reading an operational state of the hardware device from the controller;
    transfer information identifying the operational state to the replacement controller.

6. The one or more non-transitory computer-readable storage mediums of claim 1, wherein the hardware device is an I/O device, and wherein the data corresponds to any data, received by the I/O device, that originates from a user, a hardware component, or a software entity.

7. The one or more non-transitory computer-readable storage mediums of claim 1, wherein the hardware device is a keyboard, and wherein the data identifies one or more keystrokes performed on the keyboard.

8. The one or more non-transitory computer-readable storage mediums of claim 1, wherein the hardware device is a network interface card, and wherein the data corresponds to one or more packets that have been received or transmitted.

9. The one or more non-transitory computer-readable storage mediums of claim 1, wherein the hardware device is a physical display, and wherein the data corresponds to information shown on the physical display.

10. The one or more non-transitory computer-readable storage mediums of claim 1, wherein the hardware device is a storage device, and wherein the replacement controller is configured to portray the same device characteristics as the controller.

11. The one or more non-transitory computer-readable storage mediums of claim 1, wherein withdrawing control of the controller from the host operating system is performed contemporaneous with establishing the host operating system within a virtual machine container.

12. An apparatus, comprising:
    one or more processors; and
    one or more computer-readable mediums, which when executed by the one or more processors, cause:

preventing a host operating system from inspecting or modifying data received by a controller of a hardware device by performing:

immediately after booting the host operating system, contemporaneously moving the host operating system to a virtual machine container and withdrawing direct control of the controller from the host operating system by granting control of the controller to a hypervisor;

after moving the host operating system to the virtual machine container, providing a replacement controller for the hardware device to the host operating system, wherein said replacement controller is not capable of communicating with said hardware device; and upon the hypervisor receiving the data via the controller, the hypervisor forwarding the data to a relevant virtual machine responsible for processing the data.

13. The apparatus of claim 12, wherein the replacement controller is an emulated controller for the same type of device as said hardware device, an emulated controller for a different type of device as said hardware device, or a paravirtual device driver.

14. The apparatus of claim 12, wherein withdrawing control of the controller from the host operating system comprises:

the host operating system entering a virtual sleep state to quiesce said hardware device.

15. The apparatus of claim 12, wherein execution of the one or more sequences of instructions further causes:

generating a hot unplug event to remove the controller from the control of the host operating system; and generating a hot plug event to provide control of the replacement controller to the host operating system.

16. The apparatus of claim 12, wherein execution of the one or more sequences of instructions further causes:

reading an operational state of the hardware device from the controller;

transfer information identifying the operational state to the replacement controller.

17. The apparatus of claim 12, wherein the hardware device is an I/O device, and wherein the data corresponds to any data, received by the I/O device, that originates from a user, a hardware component, or a software entity.

18. The apparatus of claim 12, wherein the hardware device is a keyboard, and wherein the data identifies one or more keystrokes performed on the keyboard.

19. The apparatus of claim 12, wherein the hardware device is a network interface card, and wherein the data corresponds to one or more packets that have been received or transmitted.

20. The apparatus of claim 12, wherein the hardware device is a physical display, and wherein the input data corresponds to information shown on the physical display.

21. The apparatus of claim 12, wherein the hardware device is a storage device, and wherein the replacement controller is configured to portray the same device characteristics as the controller.

22. The apparatus of claim 12, wherein withdrawing control of the controller from the host operating system is performed contemporaneous with establishing the host operating system within a virtual machine container.

23. A method for preventing a host operating system from inspecting or modifying data received by a controller of a hardware device, comprising:

immediately after booting the host operating system, contemporaneously moving the host operating system to a virtual machine container and withdrawing direct control of the controller from the host operating system by granting control of the controller to a hypervisor;

after moving the host operating system to the virtual machine container, providing a replacement controller for the hardware device to the host operating system, wherein said replacement controller is not capable of communicating with said hardware device; and upon the hypervisor receiving the input data via the controller, the hypervisor forwarding the data to a relevant virtual machine responsible for processing the data.

24. One or more non-transitory computer-readable storage mediums storing one or more sequences of instructions, which when executed by one or more processors, cause:

preventing a host operating system from inspecting or modifying data received by a controller of a hardware device by performing:

immediately after booting the host operating system, contemporaneously moving the host operating system to a virtual machine container and withdrawing direct control of the controller from the host operating system by granting control of the controller to a hypervisor;

after moving the host operating system to the virtual machine container, providing a replacement controller for the hardware device to the host operating system, wherein said replacement controller does not permit said host operating system unrestricted access to said hardware device; and upon the hypervisor receiving the data via the controller, the hypervisor forwarding the data to a relevant virtual machine responsible for processing the data.

\* \* \* \* \*